(12) United States Patent
Sakurai et al.

(10) Patent No.: US 9,911,543 B2
(45) Date of Patent: Mar. 6, 2018

(54) CAPACITOR

(71) Applicant: HITACHI CHEMICAL COMPANY, LTD., Tokyo (JP)

(72) Inventors: Atsushi Sakurai, Tokyo (JP); Takafumi Masui, Tokyo (JP); Masaaki Sekiya, Tokyo (JP); Noritaka Eguchi, Tokyo (JP); Yoshimi Wakamatsu, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 43 days.

(21) Appl. No.: 15/108,025

(22) PCT Filed: Dec. 22, 2014

(86) PCT No.: PCT/JP2014/083955
§ 371 (c)(1),
(2) Date: Jun. 24, 2016

(87) PCT Pub. No.: WO2015/098865
PCT Pub. Date: Jul. 2, 2015

(65) Prior Publication Data
US 2016/0343518 A1    Nov. 24, 2016

(30) Foreign Application Priority Data

Dec. 26, 2013  (JP) ................. 2013-270462

(51) Int. Cl.
*H01G 11/70* (2013.01)
*H01G 11/74* (2013.01)
(Continued)

(52) U.S. Cl.
CPC ............ *H01G 11/24* (2013.01); *H01G 11/06* (2013.01); *H01G 11/28* (2013.01); *H01G 11/66* (2013.01);
(Continued)

(58) Field of Classification Search
CPC .......... H01G 11/72; H01G 11/74; H01G 11/70
See application file for complete search history.

(56) References Cited

U.S. PATENT DOCUMENTS

| 2012/0251854 A1 | 10/2012 | Kusama et al. |
| 2013/0022862 A1 | 1/2013 | Suzuki et al. |

(Continued)

FOREIGN PATENT DOCUMENTS

| CN | 102959662 A | 3/2013 |
| JP | S64-43549 A | 3/1989 |

(Continued)

OTHER PUBLICATIONS

International Search Report for PCT/JP2014/083955 dated Apr. 7, 2015; English translation submitted herewith (5 Pages).
Office Action of CN Appln. No. 201480070836.7 dated Dec. 4, 2017 with English translation.

*Primary Examiner* — Eric Thomas
(74) *Attorney, Agent, or Firm* — Fitch, Even, Tabin & Flannery, LLP

(57) ABSTRACT

Provided herein is a capacitor in which an electrolyte is infiltrated into a wound electrode group faster than conventionally. A negative current collecting member 9 has one slit 57 formed to extend across a protruded portion 49 and a negative current collecting member body (first welding portion) 53 and to penetrate the protruded portion 49 and the negative current collecting member body 53 in a thickness direction. The slit 57 passes through the center of the protruded portion 49, and extends entirely across the protruded portion 49 such that both ends of the slit 57 reach the negative current collecting member body 53.

30 Claims, 11 Drawing Sheets

(51) Int. Cl.
*H01G 11/24* (2013.01)
*H01G 11/66* (2013.01)
*H01G 11/06* (2013.01)
*H01G 11/28* (2013.01)
*H01G 11/82* (2013.01)

(52) U.S. Cl.
CPC .............. *H01G 11/70* (2013.01); *H01G 11/74* (2013.01); *H01G 11/82* (2013.01); *Y02E 60/13* (2013.01); *Y02T 10/7022* (2013.01)

(56) References Cited

U.S. PATENT DOCUMENTS

| | | |
|---|---|---|
| 2013/0163147 A1 | 6/2013 | Uehara |
| 2013/0224546 A1 | 8/2013 | Hama et al. |
| 2014/0113185 A1* | 4/2014 | Mori ................ H01M 2/06 |
| | | 429/179 |

FOREIGN PATENT DOCUMENTS

| | | | | |
|---|---|---|---|---|
| JP | 2001-256954 A | | 9/2001 | |
| JP | 2009064946 A | * | 3/2009 | ............ H01G 9/016 |
| JP | 2011-134641 A | | 7/2011 | |
| JP | 2012-216653 A | | 11/2012 | |
| WO | 2011/092845 A1 | | 8/2011 | |
| WO | 2012/036249 A1 | | 3/2012 | |
| WO | 2012/039497 A1 | | 3/2012 | |

* cited by examiner

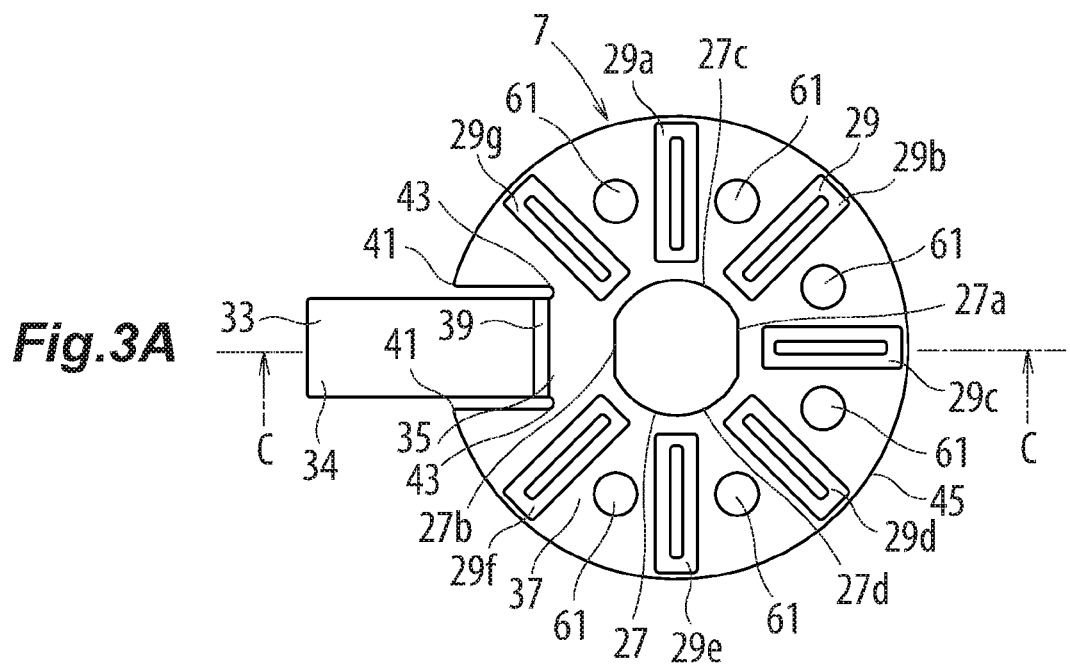
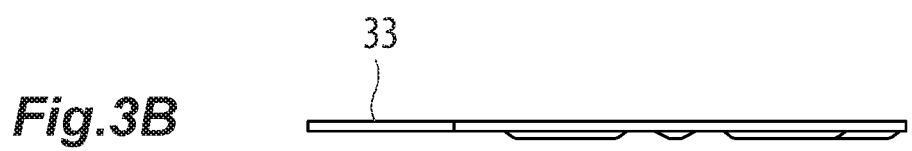
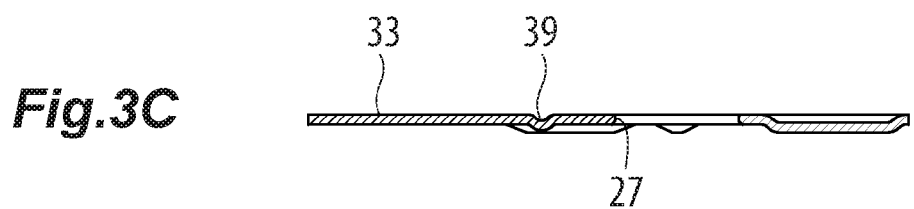

CAPACITOR

CROSS-REFERENCE TO RELATED APPLICATIONS

This application is a U.S. national phase application filed under 35 U.S.C. § 371 of International Application No. PCT/JP2014/083955, filed Dec. 22, 2014, designating the United States, which claims priority from Japanese Application No. 2013-270462 filed Dec. 26, 2013, which are hereby incorporated herein by reference in their entirety for all purposes.

TECHNICAL FIELD

The present invention relates to a capacitor such as a lithium ion capacitor.

BACKGROUND ART

Capacitors such as lithium ion capacitors advantageously have a high energy density, a low self-discharge rate, and good cycle performance. Therefore, in recent years, such capacitors have been expected to be used as a power source for automobiles such as hybrid vehicles and electric vehicles by increasing the size or the capacity of the capacitors. Examples of the capacitors used as power sources for automobiles include capacitors of a wound type in which a wound electrode group formed by winding positive and negative electrodes via a separator about an axial core is contained in a bottomed cylindrical container together with an electrolyte.

In conventional capacitors of this type, the electrolyte is poured into the container using a conduit formed inside the cylindrical axial core to infiltrate the electrolyte into the wound electrode group. A protruded portion to be fitted with one end of the axial core is formed on a current collecting member located on the bottom portion side of the container (Patent Document 1).

In the thus constructed capacitors, the current collecting member which is electrically connected to a lid member is integrally provided with an elongated tab to be electrically connected to the lid member (Patent Document 2).

RELATED-ART DOCUMENT

Patent Document

Patent Document 1: WO 2012/039497A
Patent Document 2: JPU S64-43549A

SUMMARY OF INVENTION

Technical Problem

In the structure disclosed in Patent Document 1, an end portion of the axial core and the current collecting member tightly contact each other, and therefore it may take time for the poured electrolyte to be infiltrated into the wound electrode group.

In the structure disclosed in Patent Document 2, the tab is bent at its root. Therefore, if a bending operation is performed a plurality of times during welding work, a crack may be caused at the boundary portion between a welding portion and the tab of the current collecting member, which may increase the resistance of the tab.

An object of the present invention is to provide a capacitor that facilitates infiltration of an electrolyte into a wound electrode group when the electrolyte is poured.

Another object of the present invention is to provide a capacitor in which a crack is not easily caused in the boundary portion between a welding portion and a tab of a current collecting member.

Solution to Problem

The present invention is aimed at improving a capacitor as described below. The capacitor of the present invention includes an electrode group unit, an electrically conductive bottomed cylindrical container, and an electrically conductive lid member. The electrode group unit includes a wound electrode group, a first current collecting member, and a second current collecting member. The wound electrode group is formed by winding a stacked member around a cylindrical axial core. The stacked member is formed by stacking an electrode having one of positive and negative polarities and formed of an elongated current collector having an active material layer formed thereon such that a first welded portion is left on one width-direction end of the electrode, a separator, and an electrode having the other of the polarities and formed of an elongated current collector having an active material layer formed thereon such that a second welded portion is left on the other width-direction end of the electrode. The first current collecting member is supported by one end of the axial core, and welded to the first welded portion of the electrode having the one of the polarities and included in the wound electrode group. The second current collecting member is supported by the other end of the axial core, and welded to the second welded portion of the electrode having the other of the polarities and included in the wound electrode group. The container has an opening portion at one end thereof, and is configured to contain the electrode group unit therein. The lid member is electrically insulated from the container, and configured to block the opening portion of the container. The first current collecting member is electrically connected to the container. The second current collecting member is electrically connected to the lid member. In the present invention, the first current collecting member includes a protruded portion, a first welding portion, and at least one slit. The protruded portion is protruded in a direction away from the axial core, and fitted with the one end of the axial core. The first welding portion is located on an outer side of the protruded portion, and extends outward in a radial direction of the axial core to be welded to the first welded portion of the electrode having the one of the polarities. The at least one slit extends across the protruded portion and the first welding portion, and penetrates the protruded portion and the first welding portion in a thickness direction. Providing such a slit allows an electrolyte to be spread through the slit inside the container when the electrolyte is poured. Therefore, the electrolyte is infiltrated into the wound electrode group faster than conventionally.

The slit may be shaped to extend entirely across the protruded portion such that both ends of the slit reach the first welding portion. With the thus formed slit, the electrolyte, which is accumulated from the bottom portion side of the container, passes through the slit, which extends to the first welding portion, to be directly infiltrated into the wound electrode group. The number of slits may be determined as desired. In consideration of the strength of the protruded portion, however, it is sufficient to provide only one slit that passes through the center of the protruded portion and extends entirely across the protruded portion such that both ends of the slit reach the first welding portion.

A pair of recessed portions may be formed at the one end of the axial core to penetrate the axial core in the radial direction of the axial core, open toward the protruded portion, and oppose each other in the radial direction. Preferably, the pair of recessed portions coincide with the slit when the one end of the axial core is fitted with the protruded portion. This allows the electrolyte to flow smoothly through the axial core.

The first welding portion of the first current collecting member may include a plurality of first elongated projecting portions for welding. The plurality of first elongated projecting portions project toward the wound electrode group, open toward a bottom portion of the container, and are formed at intervals in a circumferential direction about the protruded portion. Preferably, the plurality of first elongated projecting portions are formed to extend between the protruded portion and an outer periphery of the first welding portion. In a different point of view, the first elongated projecting portions are preferably terminated before the outermost periphery. With this configuration, welding beads do not project beyond the outermost periphery of the first welding portion, thereby preventing unnecessary short-circuiting due to projected welding beads. The plurality of first elongated projecting portions may be welded to the first welded portion of the wound electrode group by laser welding.

The plurality of first elongated projecting portions may be constant in dimension as measured in the width direction which is orthogonal to a direction from the vicinity of the protruded portion to the vicinity of the outer periphery. However, the plurality of first elongated projecting portions may be wider as measured in the vicinity of the outer periphery of the first welding portion than in the vicinity of the protruded portion. Such a shape allows heat to be dispersed on the side of the terminal ends of the plurality of first elongated projecting portions at the time of laser welding along the plurality of first elongated projecting portions outwardly from a center region of the current collecting member. The current collecting member can thereby be prevented from being blown out in the vicinity of the outer periphery thereof.

The plurality of first elongated projecting portions are formed at equal intervals in the circumferential direction. Two of the plurality of first elongated projecting portions are disposed on an extension line of the slit, and the two first elongated projecting portions are shorter than the rest of the plurality of first elongated projecting portions. This structure allows the slit to be lengthened.

The second current collecting member has a through hole formed therein and includes a second welding portion, and a tab. The through hole is fitted with the other end of the axial core. The second welding portion is located on an outer side of the through hole, and extends outward in the radial direction of the axial core to be welded to the second welded portion of the electrode having the other of the polarities. The tab has two ends, one of the two ends being integrally provided with the second welding portion and the other of the two ends being electrically connected to the lid member. Preferably, at least one elongated projection is formed in the vicinity of the one end of the tab to extend in a width direction of the tab, projects toward the wound electrode group, and opens toward the lid member. Providing such an elongated projection allows the tab to be easily bent along the elongated projection when the tab is bent toward the lid member. This consequently prevents mechanical strength of the boundary portion between the second welding portion of the second current collecting member and the tab from decreasing, furthermore preventing a crack from being caused at the boundary portion.

The second welding portion of the second current collecting member may include a recessed portion extending from an outermost periphery of the second welding portion toward the through hole and penetrating the second welding portion in a thickness direction. The one end of the tab may be integrally provided with a bottom portion of the recessed portion. This configuration can substantially lengthen the tab, thereby facilitating welding between the lid member and the tab.

As with the first welding portion of the first current collecting member, the second welding portion of the second current collecting member may include a plurality of second elongated projecting portions for welding. The plurality of second elongated projecting portions project toward the wound electrode group, open toward the lid member, and are formed at intervals in a circumferential direction about the through hole. As with the first elongated projecting portions, the plurality of second elongated projecting portions are preferably formed to extend between the through hole and the outer periphery of the second welding portion. In a different point of view, the plurality of second elongated projecting portions are preferably terminated before the outermost periphery. The plurality of second elongated projecting portions may be welded to the second welded portion of the wound electrode group by laser welding.

Preferably, the through hole, which is formed in the second welding portion of the second current collecting member, is defined by being surrounded by a pair of parallel edge portions and a pair of arcuate edge portions connecting both ends of the pair of parallel edge portions. The pair of parallel edge portions of the through hole thus formed can be utilized to position the other end of the axial core, thereby facilitating insertion of the axial core into the through hole.

Also for the second current collecting member, as a matter of course, the plurality of second elongated projecting portions may be wider as measured in the vicinity of the outer periphery of the second welding portion than in the vicinity of the through hole.

Preferably, the first current collecting member is a negative current collecting member; the second current collecting member is a positive current collecting member; and the first welding portion of the first current collecting member is larger than the second welding portion of the second current collecting member. With this configuration, the number of welding points of the first current collecting member is larger than the number of welding points of the second current collecting member. This reduces the resistance of the negative current collecting member, thereby increasing the capacity of the capacitor.

BRIEF DESCRIPTION OF DRAWINGS

FIG. 3A is a plan view of a positive current collecting member used in the embodiment of the present invention;

FIG. 3B is a front view of the positive current collecting member; and FIG. 3C is a sectional view taken along line C-C of FIG. 3A.

DESCRIPTION OF EMBODIMENTS

Now, an embodiment in which the present invention is applied to one type of a capacitor, namely a cylindrical lithium ion capacitor will be described below with reference to the drawings.
(Configuration of Embodiment)
<Overall Configuration>

Figure 1:
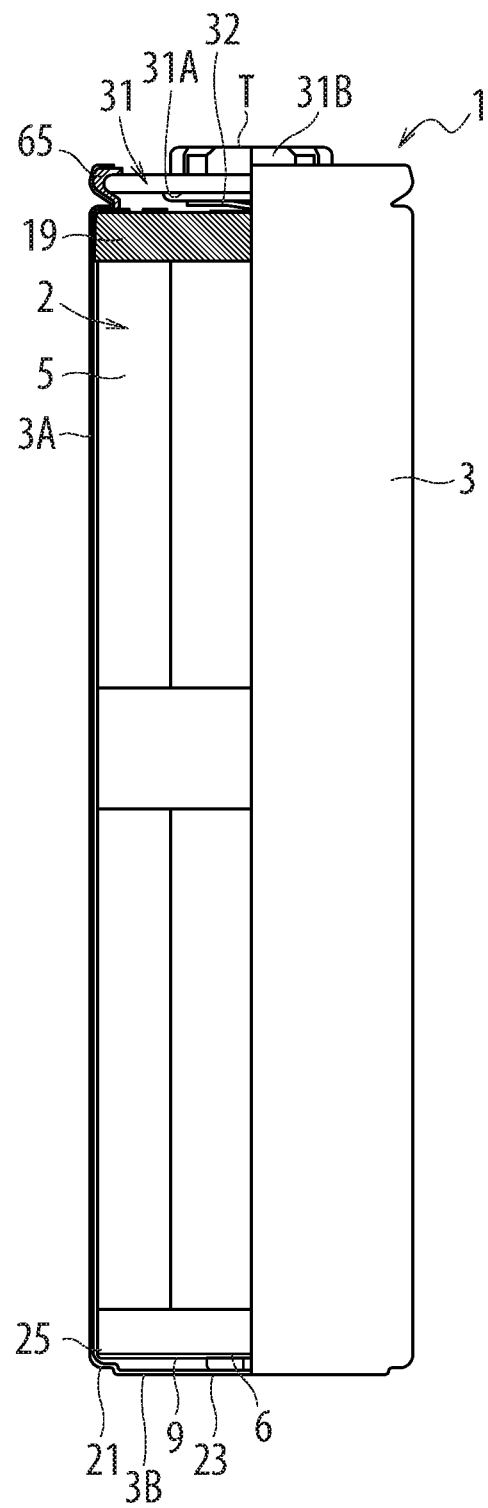
FIG. 1 is a half sectional view schematically illustrating an example cylindrical lithium ion capacitor of one type of capacitor, half in section, according to an embodiment of the present invention.
Figure 2:
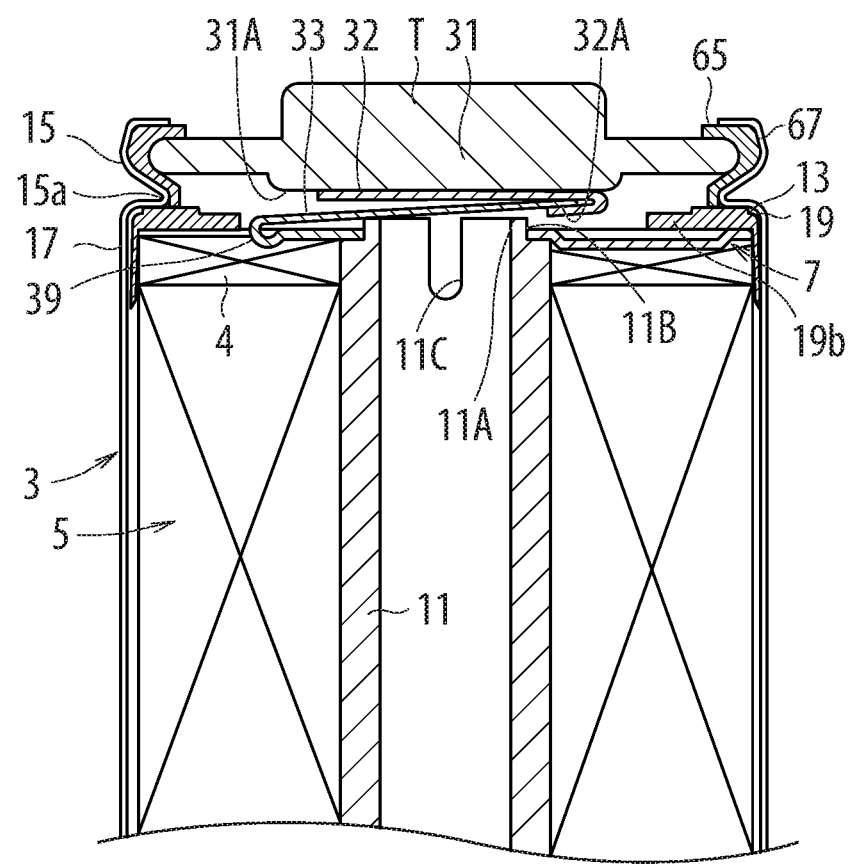
FIG. 2 is an enlarged sectional view illustrating a positive electrode side of the capacitor according to the embodiment of the present invention.

FIG. 1 is a half sectional view schematically illustrating a cylindrical lithium ion capacitor 1 (hereinafter referred to simply as "capacitor 1") according to the present embodiment of the present invention. For illustrating purpose, the capacitor 1 is halved in section with a positive electrode terminal T facing up. FIG. 2 is an enlarged sectional view illustrating a positive electrode side of the capacitor according to the embodiment of the present invention. In FIG. 2, the sectional shape of a wound electrode group 5 is not illustrated and the internal structure of a lid member 31 is also not illustrated. The capacitor 1 includes a container 3 made of steel plated with nickel and shaped in a bottomed cylinder. The container 3 includes a peripheral wall 3A and a bottom wall 3B. An annular projected portion 15 is provided at a peripheral wall portion of the peripheral wall 3A located on the lid member 31 side with respect to a positive current collecting member (second current collecting member) 7. The annular projected portion 15 is formed by being deformed to project toward an axial core 11 in the radial direction of the axial core 11 as discussed later. An electrode group unit 2 is contained in the container 3. The electrode group unit 2 is constituted from a combination of the wound electrode group 5, the positive current collecting member 7, and a negative current collecting member (first current collecting member) 9. The wound electrode group 5 is constituted by winding an elongated positive electrode and an elongated negative electrode around the hollow cylindrical axial core 11, which is made of polyphenylene sulfide (PPS), via a separator.

The positive electrode of the wound electrode group 5 is formed of an elongated current collector having a positive active material layer formed thereon such that a welded portion is left on one width-direction end of the electrode. Similarly, the negative electrode is formed of an elongated current collector having a negative active material layer formed thereon such that a welded portion is left on the other width-direction end of the electrode. The wound electrode group 5 is constituted by winding a stacked member, which is formed by stacking the positive electrode and the negative electrode via the separator, around the axial core 11 such that a welded portion 4 (second welded portion) [see FIG. 2] of the positive electrode and a welded portion 6 (first welded portion) [see FIG. 1] of the negative electrode are located at respective end portions of the wound electrode group 5. Porous base material such as kraft paper may be used as the separator.

As illustrated in FIG. 2, an outer periphery 13 of the positive current collecting member 7 is shaped and sized to extend to a position beyond a top portion 15a of the annular projected portion 15. A plate-like portion 19b of an insulating ring member 19, which will be described in detail later, is disposed in a compressed state between the positive current collecting member 7 and the annular projected portion 15, and between the positive current collecting member 7 and an annular wall portion 17 of the peripheral wall 3A which is continuous with the annular projected portion 15. In the embodiment, the positive current collecting member 7 and the insulating ring member 19 constitute fixing means.

As illustrated in FIG. 1, the bottom wall 3B of the container 3 includes an annular bottom wall portion 21 and a protruded portion 23 to enhance the strength of the container 3. The negative current collecting member 9 is shaped and sized such that an outer periphery 25 is located on the side of the peripheral wall 3A of the container 3 with respect to the inner edge portion of the annular bottom wall portion 21.

<Positive Current Collecting Member>

FIG. 3A is a plan view of the positive current collecting member 7. FIG. 3B is a front view of the positive current collecting member 7. FIG. 3C is a sectional view taken along line C-C of FIG. 3A. The positive current collecting member 7 includes: a through hole 27 to be fitted with an end portion 11A [see FIG. 2] of the axial core 11; a positive current collecting member body 37 that constitutes a second welding portion located on the outer side of the through hole 27 and extending outward in the radial direction of the axial core 11 to be welded to the welded portion 4 (second welded portion) [see FIG. 2] of the positive electrode; and a tab 33 having two ends, one of the two ends being integrally provided with the positive current collecting member body 37 and the other of the two ends being electrically connected to the lid member 31. The positive current collecting member 7 is formed by pressing an aluminum (including an aluminum alloy) plate, and includes the positive current collecting member body 37 which has a ring shape in which the through hole 27 is formed in the center portion as illustrated in FIG. 3A. As illustrated in FIG. 3A, the through hole 27 is shaped to be fitted with the end portion 11A of the axial core 11 to prevent displacement of the positive current collecting member 7 from the center of the wound electrode group 5. The profile of the through hole 27 is defined by being surrounded by a pair of parallel straight edge portions 27a and 27b and a pair of arcuate edge portions 27c and 27d connecting both ends of the straight edge portions 27a and 27b. The profile of a stepped portion 11B formed at the end portion 11A of the axial core 11 is analogous to the shape of the through hole 27. A pair of recessed portions 11C are formed at the end portion 11A of the axial core 11 at locations at which the recessed portions 11C oppose the pair of arcuate edge portions 27c and 27d. Forming the through hole 27 and the end portion 11A of the axial core 11 in such a shape facilitates positioning during insertion of the end portion 11A of the axial core 11 into the through hole 27.

For welding the positive current collecting member 7 and the welded portion 4, the positive current collecting member 7 is first opposed to the welded portion 4 located on the one end of the positive electrode included in the wound electrode group 5, and is then moved toward the wound electrode group 5, and is finally placed on the welded portion 4. Thus, the welded portion 4 of the positive electrode and the positive current collecting member 7 are welded to each other by laser welding as discussed later. For laser welding, the positive current collecting member 7 is provided with seven grooves 29a to 29g that project toward the wound electrode group 5 and that are open in the direction away from the wound electrode group 5. In the embodiment, the grooves 29a to 29g constitute a second elongated projecting portion for welding. The seven grooves 29a to 29g are radially formed at intervals in the circumferential direction about the through hole 27. The grooves 29a to 29g have an equal length. In the embodiment, the grooves 29a to 29g are formed such that two adjacent grooves 29 are formed at equal intervals in the circumferential direction with respect to the groove 29c, which is formed at a position opposite to the tab 33 across the through hole 27.

The grooves 29a to 29g are formed between the through hole 27 and an outer periphery or a peripheral portion 45 of the positive current collecting member body 37 (second welding portion) located on the outer side of the through hole 27 to be welded to the welded portion 4 of the positive electrode. In the embodiment, the grooves 29a to 29g are terminated before the outermost periphery of the positive current collecting member body 37. With this configuration, welding beads do not project beyond the outermost periphery of the positive current collecting member body 37, thereby preventing unnecessary short-circuiting due to projected welding beads.

One end of the tab 33 is electrically connected to the lid member 31 and the other end 35 of the tab 33 is integrally provided with the positive current collecting member body 37. One elongated projection 39 is formed in the vicinity of the other end 35 of the tab 33 to extend in the width direction of the tab 33, project toward the wound electrode group 5, and open toward the lid member 31. Further, the positive current collecting member body 37 includes two recessed portions 41 that extend from the outermost periphery of the positive current collecting member body 37 toward the through hole 27 and penetrate the positive current collecting member body 37 in the thickness direction. The other end 35 of the tab 33 is integrally formed with bottom portions 43 of the recessed portions 41. Providing such an elongated projection 39 allows the tab 33 to be easily bent along the elongated projection 39 when the tab 33 is bent toward the lid member 31 as illustrated in FIG. 6B. As a result, mechanical strength at the boundary portion between the positive current collecting member body 37 and the tab 33 can be prevented from decreasing, thereby preventing a crack from being caused at the boundary portion. Providing the two recessed portions 41 on both sides to the tab 33 can substantially increase the length of the tab 33. This facilitates welding between the lid member 31 and the tab 33.

Circular gas discharge holes 61 are formed in the positive current collecting member body 37 at positions between the adjacent grooves 29.

<Negative Current Collecting Member>

Figure 4A:
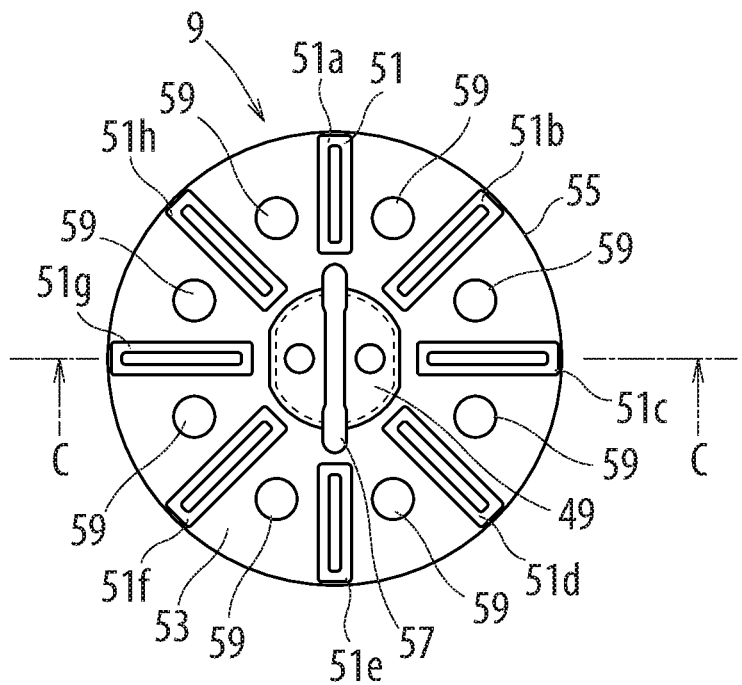
FIG. 4A is a plan view of a negative current collecting member used in the embodiment of the present invention.
Figure 4B:
FIG. 4B is a side view of the negative current collecting member.
Figure 4C:
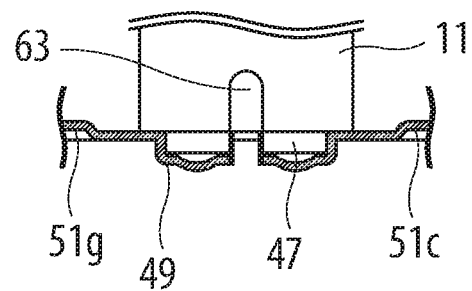
FIG. 4C is a sectional view illustrating that an axial core and the negative current collecting member are fitted with each other.

FIG. 4A is a plan view of the negative current collecting member 9. FIG. 4B is a side view of the negative current collecting member 9. FIG. 4C is a sectional view illustrating that the axial core 11 and the negative current collecting member 9 are fitted with each other. In the figures, the negative current collecting member 9 is made of either nickel or a metal material obtained by plating copper with nickel. In the embodiment, the negative current collecting member 9 is made of a metal material obtained by plating copper with nickel. As illustrated in FIGS. 4A-4C, the negative current collecting member 9 has a disk shape, and includes a protruded portion 49 protruded at the center portion in a direction away from the axial core 11 and fitted with the other end portion 47 of the axial core 11, and a negative current collecting member body 53 located on the outer side of the protruded portion 49 to be welded to the welded portion 6 (first welded portion) of the negative electrode. In the embodiment, the negative current collecting member body 53 constitutes the first welding portion.

The negative current collecting member 9 is welded to the welded portion 6 (see FIG. 1), on the other width-direction end, of the negative electrode included in the wound electrode group 5. For welding the negative current collecting member 9 and the welded portion 6, the negative current collecting member 9 is first opposed to the welded portion 6 located on the other end of the negative electrode included in the wound electrode group 5, and is then moved toward the wound electrode group 5, and is finally placed on the welded portion 6. Thus, the welded portion 6 of the negative electrode and the negative current collecting member 9 are welded to each other by laser welding as discussed later. For laser welding, the negative current collecting member 9 is provided with eight grooves 51a to 51h that project toward the wound electrode group 5 and that open in the direction away from the wound electrode group 5. In the embodiment, the grooves 51a to 51h constitute a first elongated projecting portion for welding. The grooves 51a to 51h are formed by pressing, and extend linearly radially from the protruded portion 49 of the negative current collecting member 9. The grooves 51a to 51h are formed between a protruded portion 49 and an outer periphery or a peripheral portion 55 of the negative current collecting member body 53. The grooves 51a to 51h are terminated before the outermost periphery of the negative current collecting member body 53. With this configuration, welding beads do not project beyond the outermost periphery of the negative current collecting member body 53, thereby preventing unnecessary short-circuiting due to projected welding beads.

The eight grooves 51a to 51h are formed at intervals in the circumferential direction about the protruded portion 49. In the embodiment, the grooves 51a and 51e, which are located on the extension line of a slit 57, is shorter in length than the other grooves 51b, 51c, 51d, 51f, 51g, and 51h. This structure can lengthen the slit 57.

The negative current collecting member 9 has one slit 57 formed therein to extend across the protruded portion 49 and the negative current collecting member body 53 (first welding portion) and to penetrate the protruded portion 49 and the negative current collecting member body 53 in the thickness direction. The slit 57 passes through the center of the protruded portion 49, and extends entirely across the protruded portion 49 such that both ends of the slit 57 reach the negative current collecting member body 53. An electrolyte is spread through the slit 57 inside the container when the electrolyte is poured through the axial core 11. Therefore, the electrolyte is infiltrated into the wound electrode group 5 faster than conventionally. In the embodiment, the slit 57 extends to the negative current collecting member body 53. Therefore, the electrolyte, which is filled from the bottom portion side of the container, passes through the slit 57, which extends to the negative current collecting member body 53, to be directly infiltrated into the wound electrode group 5.

The number of slits 57 is arbitrary. In consideration of the strength of the protruded portion 49, however, it is sufficient to provide only one slit that passes through the center of the protruded portion 49 and extends entirely across the protruded portion 49 such that both ends of the slit reach the negative current collecting member body 53 as in the embodiment.

In the embodiment, a pair of recessed portions 63 are formed at the end portion 47 of the axial core 11 to penetrate the axial core 11 in the radial direction of the axial core 11, open toward the protruded portion 49, and oppose each other in the radial direction. The pair of recessed portions 63 coincide with the slit 57 when the end portion 47 of the axial core 11 is fitted with the protruded portion 49. This allows the electrolyte to flow smoothly through the axial core 11. Circular gas discharge holes 59 are formed in the negative current collecting member body 53 at positions between the adjacent grooves 51.

In the embodiment, the negative current collecting member body 53 is formed to be larger than the positive current collecting member body 37. Consequently, the number of welding points between the welded portion of the negative electrode and the negative current collecting member 9 is larger than the number of welding points between the welded portion of the positive electrode and the positive current collecting member 7. This reduces the resistance of the negative current collecting member 9, which can enhance the capacity of an electrical storage device.

<Insulating Ring Member>

Figure 5A:
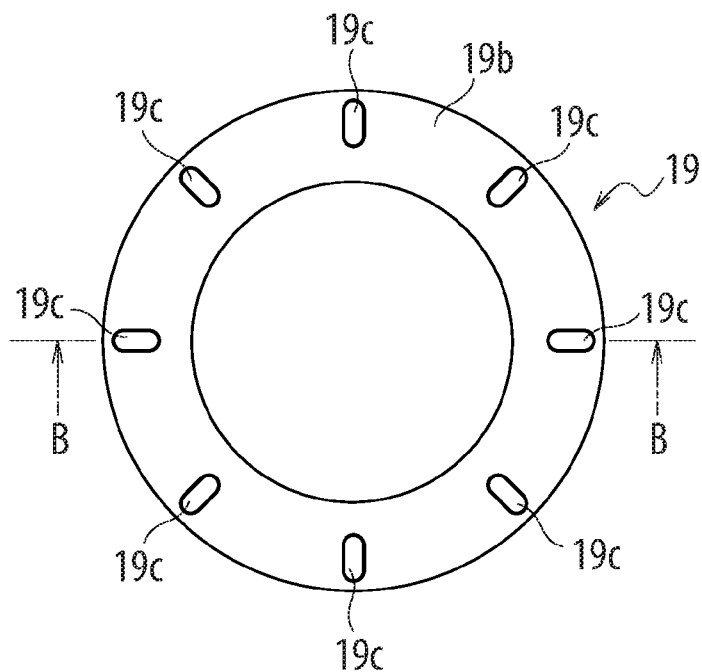
FIG. 5A is a plan view of an insulating ring member used in the embodiment of the present invention.
Figure 5B:
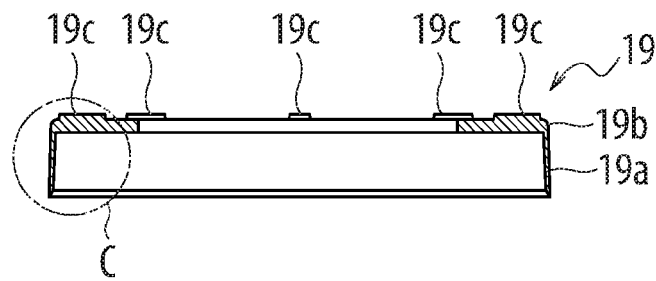
FIG. 5B is a sectional view taken along line B-B of FIG. 5A.
Figure 5C:
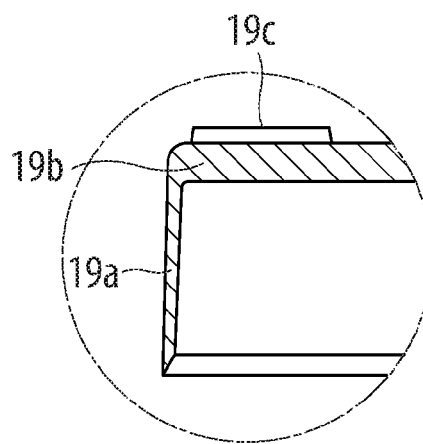
FIG. 5C is an enlarged view of the C portion of FIG. 5B.

As illustrated in FIGS. 5A to 5C, the insulating ring member 19 includes a cylindrical portion 19a surrounding the outer periphery of an end portion of the wound electrode group 5 on the side of the positive current collecting member 7, and a plate-like portion 19b integrally formed with the cylindrical portion 19a and extending inward in the radial direction from the cylindrical portion 19a to contact the positive current collecting member 7. Eight projections 19c are integrally provided on a surface of the plate-like portion 19b, which opposes the annular projected portion 15, to contact the annular projected portion 15. The eight projections 19c are disposed at constant intervals in the circumferential direction of the axial core 11. The projections 19c are each shaped to extend in the radial direction of the axial core 11, and each have a length to project inwardly of the top portion 15a of the annular projected portion 15 in the radial direction of the axial core 11, being in contact with the annular projected portion 15. Disposing the projections 19c at constant intervals in the circumferential direction allows intensive application of pressure onto the plurality of projections 19c when the container 3 is subjected to drawing to form the annular projected portion 15. Therefore, substantially equal pressing forces are applied to the insulating ring member 19 from the plurality of projections 19c which are disposed at constant intervals. As a result, application of the substantially uniform pressing forces to the electrode group unit 2 prevents non-uniform deformation of the wound electrode group 5. This, in turn, can enhance resistance against vibration applied to the capacitor 1 in the axial direction of the axial core 11. In a configuration where the projections 19c each have a length to project inwardly of the top portion 15a of the annular projected portion 15 in the radial direction of the axial core 11, the surface areas of the projections 19c in contact with the annular projected portion 15 are substantially equal to each other at all times. As a result, fluctuations in pressing force applied to the electrode group unit 2 via the projections 19c can be minimized.

Figure 6A:
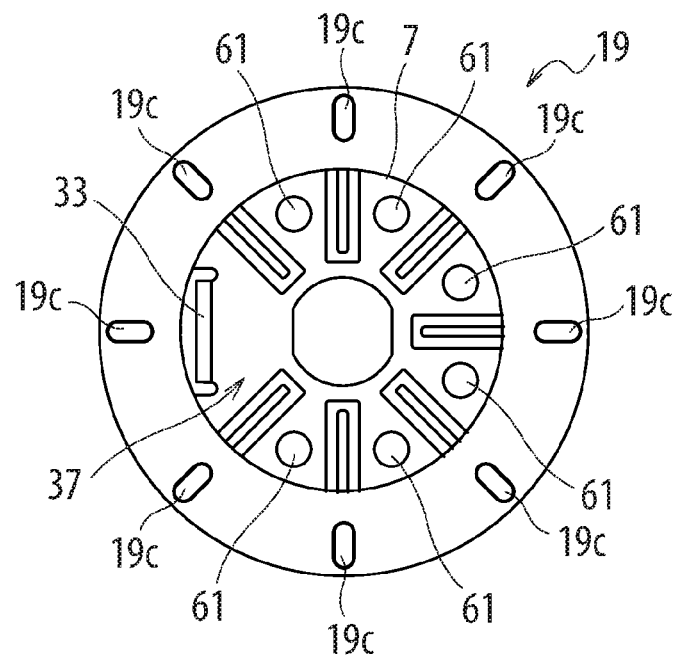
FIG. 6A is a plan view illustrating that the insulating ring member is mounted to the positive current collecting member.
Figure 6B:
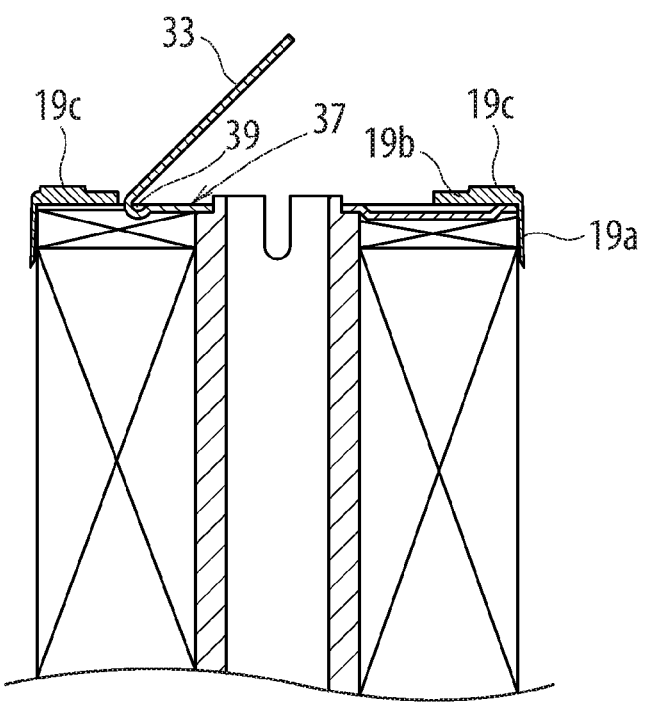
FIG. 6B is a partially enlarged view illustrating that the insulating ring member is mounted to the positive current collecting member.

FIGS. 6A and 6B are a plan view and a partial sectional view, respectively, illustrating that the insulating ring member 19 is mounted to the positive current collecting member 7. In FIG. 6A, the tab 33 is illustrated as extending vertically upright. In order to fully demonstrate the gas discharge function, the plate-like portion 19b is preferably sized not to block the gas discharge holes 61 of the positive current collecting member 7 as illustrated in FIG. 6A.

<Welding between Wound Electrode Group and Current Collecting Members>

Laser light is used to weld the welded portions of the wound electrode group 5 and the current collecting members (positive current collecting member 7 and negative current collecting member 9) to each other. In the embodiment, a direct-collecting semiconductor laser device (DLL, not illustrated) that continuously generates laser light is used as a laser welding device. Welding of the positive current collecting member 7 will be described as an example. The positive current collecting member 7 is locally melted by continuously applying laser light generated by the direct-collecting semiconductor laser device along the grooves 29 of the positive current collecting member 7 from the center portion toward the outer periphery of the positive current collecting member 7, in order to weld the welded portion 4 of the positive electrode and the positive current collecting member 7 to each other with a molten metal. Performing laser welding using the direct-collecting semiconductor laser device as in the embodiment allows the positive current collecting member to be efficiently melted, enables reliable welding, and reliably prevents an increase in resistance of the welded portion. Use of a fiber-guided semiconductor laser device or the like in place of the direct-collecting semiconductor laser device also achieves good welding results.

The negative current collecting member 9 and the welded portion 6 of the negative electrode are also welded to each other in the same manner. That is, the negative current collecting member 9 is melted to weld the welded portion of the negative electrode and the negative current collecting member 9 to each other with a molten metal.

<Placement of Wound Electrode Group into Container>

As illustrated in FIG. 1, the electrode group unit 2, which includes the wound electrode group 5 to which the current collecting members 7 and 9 have been welded, is contained in the container 3. With the electrode group unit 2 contained in the container 3, the protruded portion 49 of the negative current collecting member 9 and the bottom portion (protruded portion 23) of the container 3 are welded by spot welding using an electrode for welding inserted into the axial core 11 for electrical connection between the negative current collecting member 9 and the container 3.

The insulating ring member 19 is attached to the outer peripheral edge of the positive current collecting member 7 for electrical insulation between the positive current collecting member 7 and the container 3. A part of the container 3 is subjected to drawing in the vicinity of the opening portion to form the annular projected portion 15. Thus, the electrode group unit 2 is fixed in the container 3 as illustrated in FIG. 1.

As illustrated in FIG. 1, the lid member 31 forming a positive electrode terminal is disposed above the positive current collecting member 7. The lid member 31 is composed of a lid body 31A made of aluminum, and a lid cap 31B made of steel plated with nickel as with the container 3. As illustrated in FIG. 2, one end of a tab 32 in an elongated plate shape is welded to the lid body 31A, and a fold-back portion 32A is formed at the other end of the tab 32. A free end portion of the tab 33 of the positive current collecting member 7 is welded to the fold-back portion 32A. Consequently, the lid member 31 is electrically connected to the positive current collecting member 7 of the wound electrode group 5.

The lid member 31 is disposed on the annular projected portion 15 formed on the container 3 via an electrically insulating member 65 for electrical insulation between the lid member 31 and the container 3. The electrically insulating member 65 is made of an elastic insulating material such as rubber, for example, and is shaped to surround the entire outer periphery of the lid body 31A of the lid member 31. An annular wall portion 67 located on the side of the opening portion of the container 3 with respect to the annular projected portion 15 is curled (crimpled) toward the lid member 31. As a result, the lid member 31 is fixed between the annular wall portion 67 which has been curled and the annular projected portion 15 via the electrically insulating member 65. This enables tight sealing of the internal space of the capacitor 1.

An amount of a non-aqueous electrolyte (not illustrated) that is enough to infiltrate the entire electrode group unit 2 is poured into the container 3. The non-aqueous electrolyte may be a solution prepared by dissolving lithium phosphate hexafluoride ($LiPF_6$) as a lithium salt in a polycarbonate (PC) solvent.

Figure 7:
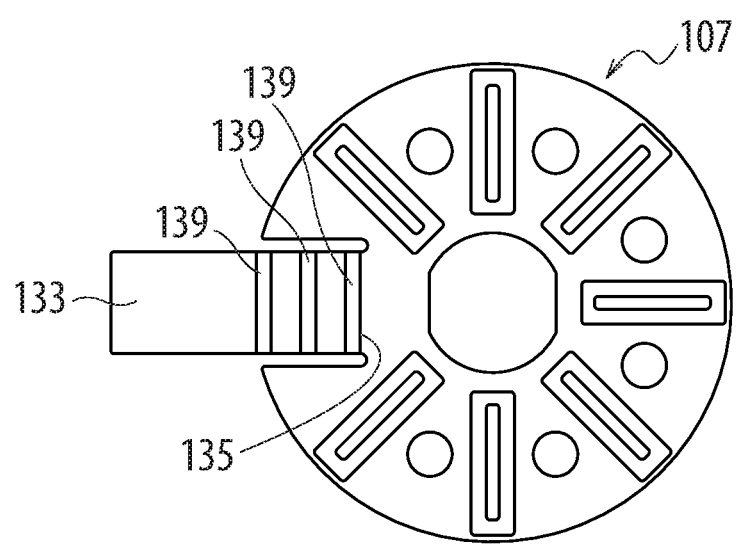
FIG. 7 is a plan view of a positive current collecting member used in one different embodiment of the present invention.
Figure 8:
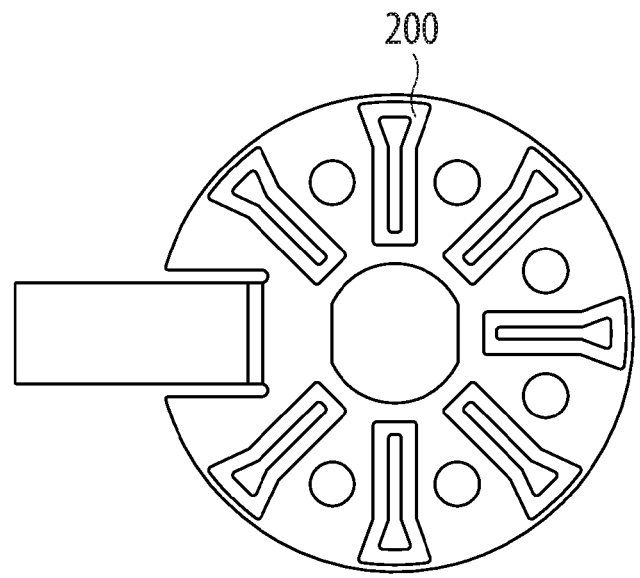
FIG. 8 is a plan view of a positive current collecting member used in a further different embodiment of the present invention.
Figure 9:
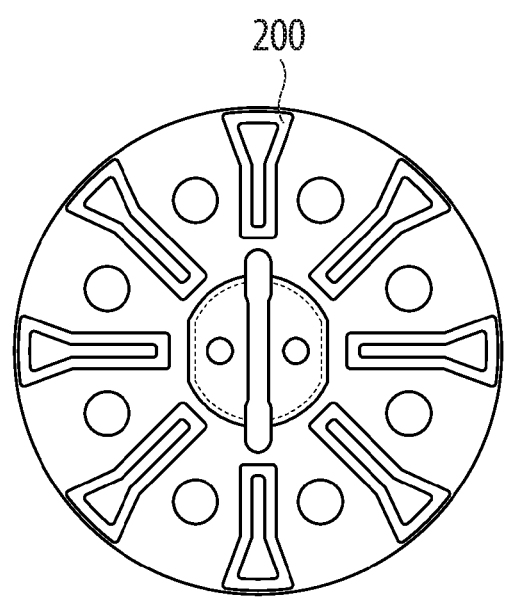
FIG. 9 is a plan view of a negative current collecting member used in the one different embodiment of the present invention.
Figure 10:
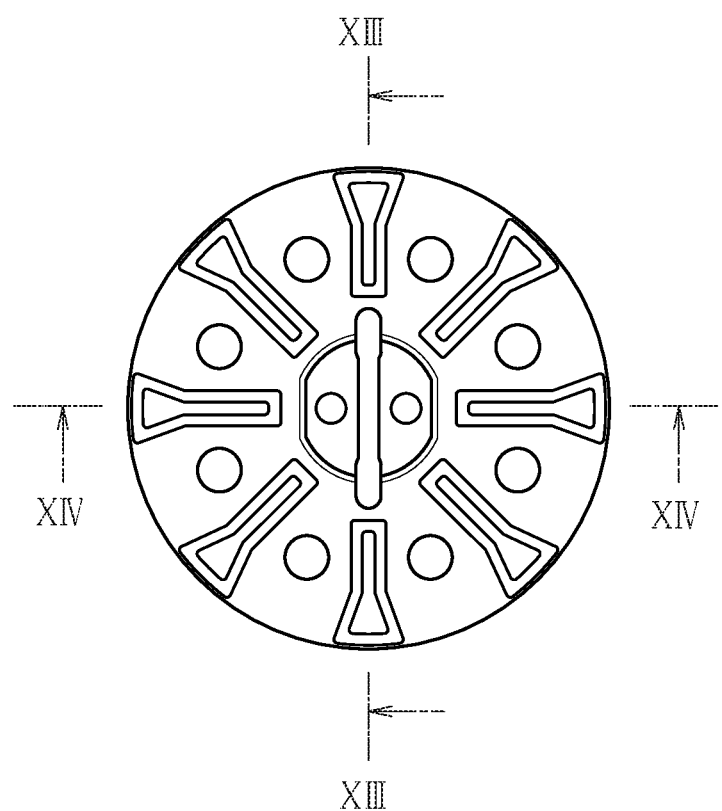
FIG. 10 is a bottom view of the negative current collecting member used in the one different embodiment of the present invention.
Figure 11:
FIG. 11 is a front view of the negative current collecting member used in the one different embodiment of the present invention.
Figure 12:
FIG. 12 is a right side view of the negative current collecting member used in the one different embodiment of the present invention.
Figure 13:
FIG. 13 is a sectional view of the negative current collecting member used in the one different embodiment of the present invention taken along line XIII-XIII of FIG. 10.
Figure 14:
FIG. 14 is a sectional view of the negative current collecting member used in the one different embodiment of the present invention taken along line XIV-XIV of FIG. 10.
Figure 15:
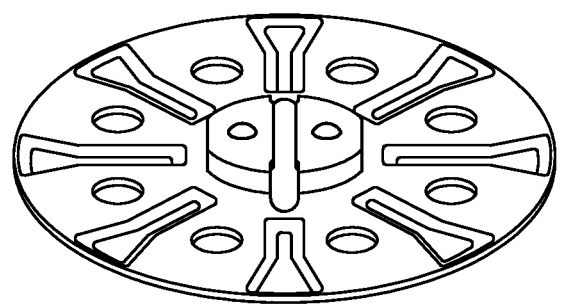
FIG. 15 is a perspective view of the negative current collecting member used in the one different embodiment of the present invention.

FIG. 7 is a plan view of a positive current collecting member 107 of a cylindrical lithium ion capacitor 101 (hereinafter referred to simply as "capacitor 101") according to one different embodiment of the present invention. In FIG. 7, component parts that are similar to those illustrated in FIG. 3A are denoted by reference numerals obtained by adding 100 to the reference numerals affixed to their counterparts in FIG. 3A and detailed description is omitted. In the capacitor 101 according to the embodiment, three elongated projections 139 are formed in the vicinity of one end 135 of a tab 133 to extend in the width direction of the tab 133, project toward a wound electrode group 105, and open toward a lid member 131. Providing such three elongated projections 139 allows the tab 133 to be easily bent at any of the three elongated projections 139. Thus, it is possible to prevent the tab from being broken by repeatedly bending the tab at the same elongated projections.

The plurality of first or second elongated projecting portions (29a to 29g, 51a to 51h) for welding provided on the first current collecting member or the second current collecting member may be shaped to be wider as measured in the vicinity of the outer periphery of the current collecting member than around the center portion of the current collecting member as with elongated projecting portions 200 for welding illustrated in FIGS. 8 to 15. In the example of FIGS. 8 to 15, end portions of the elongated projecting portions 200 on the outer peripheral side are widened into a fan shape or a bell shape. With such a shape, heat can be dispersed on the side of the terminal ends of the elongated projecting portions when laser welding is performed along the elongated projecting portions outwardly from the center region of the current collecting member. Therefore, the current collecting member can be prevented from being blown out in the vicinity of the outer periphery.

In the embodiments described above, the positive current collecting member is electrically connected to the lid member, and the negative current collecting member is electrically connected to the bottom portion of the container. However, it is a matter of course that the negative current collecting member may be electrically connected to the lid member and the positive current collecting member may be electrically connected to the bottom portion of the container.

INDUSTRIAL APPLICABILITY

According to the present invention, it is possible to provide a capacitor that facilitates infiltration of an electrolyte into a wound electrode group when the electrolyte is poured. According to the present invention, it is also possible to provide a capacitor in which a crack is not easily caused in the boundary portion between a welding portion and a tab of a current collecting member.

SIGN LISTING

1 capacitor
2 electrode group unit
3 container
5 wound electrode group
7 positive current collecting member
9 negative current collecting member
11 axial core
13 outer periphery
15 annular projected portion
17 annular wall portion
19 insulating ring member
19a cylindrical portion
19b plate-like portion
19c projection
21 annular bottom wall portion
23 protruded portion
25 outer periphery
27 through hole
29 groove
31 lid member
33 tab
37 positive current collecting member body
39 elongated projection
41 recessed portion
49 protruded portion
51 groove
53 negative current collecting member body
55 outer periphery
57 slit 59, 61 gas discharge hole
63 recessed portion
65 electrically insulating member
67 annular wall portion

The invention claimed is:
1. A capacitor comprising:
an electrode group unit including:
    a wound electrode group formed by winding a stacked member around a cylindrical axial core, the stacked member being formed by stacking an electrode having one of positive and negative polarities and formed of an elongated current collector having an active material layer formed thereon such that a first welded portion is left on one width-direction end of the electrode having the one of the polarities, a separator, and an electrode having the other of the polarities and formed of an elongated current collector having an active material layer formed thereon such that a second welded portion is left on the other width-direction end of the electrode having the other of the polarities;
    a first current collecting member supported by one end of the axial core and welded to the first welded portion of the electrode having the one of the polarities and included in the wound electrode group, and
    a second current collecting member supported by the other end of the axial core and welded to the second welded portion of the electrode having the other of the polarities and included in the wound electrode group;
an electrically conductive bottomed cylindrical container having an opening portion at one end thereof and configured to contain the electrode group unit therein; and
an electrically conductive lid member electrically insulated from the container and configured to block the opening portion of the container, wherein:
the first current collecting member is electrically connected to the container;
the second current collecting member is electrically connected to the lid member;
the first current collecting member includes:
    a protruded portion protruded in a direction away from the axial core and fitted with the one end of the axial core,
    a first welding portion located on an outer side of the protruded portion and extending outward in a radial direction of the axial core to be welded to the first welded portion of the electrode having the one of the polarities, and
    at least one slit extending across the protruded portion and the first welding portion and penetrating the protruded portion and the first welding portion in a thickness direction;
the at least one slit includes one slit passing through a center of the protruded portion and extending entirely across the protruded portion such that both ends of the one slit reach the first welding portion;
the first welding portion of the first current collecting member includes a plurality of first elongated projecting portions for welding, the plurality of first elongated projecting portions projecting toward the wound electrode group, opening toward a bottom portion of the container, and being formed at equal intervals in a circumferential direction about the protruded portion;
the plurality of first elongated projecting portions are formed to extend between the protruded portion and an outer periphery of the first welding portion;
two of the plurality of first elongated projecting portions are disposed on an extension line of the slit, and the two first elongated projecting portions are shorter than the rest of the plurality of first elongated projecting portions;
the plurality of first elongated projecting portions are welded to the first welded portion by laser welding;
a pair of recessed portions are formed at the one end of the axial core to penetrate the axial core in the radial direction of the axial core, open toward the protruded portion, and oppose each other in the radial direction;
the pair of recessed portions coincide with the slit when the one end of the axial core is fitted with the protruded portion;
the second current collecting member includes:
    a through hole to be fitted with the other end of the axial core,
    a second welding portion located on an outer side of the through hole and extending outward in the radial direction of the axial core to be welded to the second welded portion of the electrode having the other of the polarities, and
    a tab having two ends, one of the two ends being integrally provided with the second welding portion and the other of the two ends being electrically connected to the lid member;
at least one elongated projection is formed in the vicinity of the one end of the tab to extend in a width direction of the tab, projects toward the wound electrode group, and opens toward the lid member;
the second welding portion of the second current collecting member includes a recessed portion extending from an outermost periphery of the second welding portion toward the through hole and penetrating the second welding portion in a thickness direction; and
the one end of the tab is integrally provided with a bottom portion of the recessed portion;
the second welding portion of the second current collecting member includes a plurality of second elongated projecting portions for welding, the plurality of second elongated projecting portions projecting toward the wound electrode group, opening toward the lid member, and being formed at intervals in a circumferential direction about the through hole; and
the plurality of second elongated projecting portions are formed to extend between the through hole and an outer periphery of the second welding portion;
the plurality of second elongated projecting portions are terminated before the outermost periphery;
the through hole is defined by being surrounded by a pair of parallel edge portions and a pair of arcuate edge portions connecting both ends of the pair of parallel edge portions; and
the plurality of second elongated projecting portions are welded to the second welded portion by laser welding.
2. A capacitor comprising:
an electrode group unit including:
    a wound electrode group formed by winding a stacked member around a cylindrical axial core, the stacked member being formed by stacking an electrode having one of positive and negative polarities and formed of an elongated current collector having an active material layer formed thereon such that a first welded portion is left on one width-direction end of the electrode having the one of the polarities, a separator, and an electrode having the other of the polarities and formed of an elongated current collector having an active material layer formed thereon such that a second welded portion is left on the other width-direction end of the electrode having the other of the polarities;

a first current collecting member supported by one end of the axial core and welded to the first welded portion of the electrode having the one of the polarities and included in the wound electrode group, and a second current collecting member supported by the other end of the axial core and welded to the second welded portion of the electrode having the other of the polarities and included in the wound electrode group;

an electrically conductive bottomed cylindrical container having an opening portion at one end thereof and configured to contain the electrode group unit therein; and an electrically conductive lid member electrically insulated from the container and configured to block the opening portion of the container, wherein:

the first current collecting member is electrically connected to the container;

the second current collecting member is electrically connected to the lid member; and the first current collecting member includes:
- a protruded portion protruded in a direction away from the axial core and fitted with the one end of the axial core,
- a first welding portion located on an outer side of the protruded portion and extending outward in a radial direction of the axial core to be welded to the first welded portion of the electrode having the one of the polarities, and
- at least one slit extending across the protruded portion and the first welding portion and penetrating the protruded portion and the first welding portion in a thickness direction;

the second current collecting member includes:
- a through hole to be fitted with the other end of the axial core,
- a second welding portion located on an outer side of the through hole and extending outward in the radial direction of the axial core to be welded to the second welded portion of the electrode having the other of the polarities, and
- a tab having two ends, one of the two ends being integrally provided with the second welding portion and the other of the two ends being electrically connected to the lid member; and at least one elongated projection is formed in the vicinity of the one end of the tab to extend in a width direction of the tab, projects toward the wound electrode group, and opens toward the lid member.

3. The capacitor according to claim 2, wherein:
the first current collecting member is a negative current collecting member;
the second current collecting member is a positive current collecting member; and
the first welding portion of the first current collecting member is larger than the second welding portion of the second current collecting member.

4. The capacitor according to claim 2, wherein
the at least one slit extends entirely across the protruded portion such that both ends of the at least one slit reach the first welding portion.

5. The capacitor according to claim 2, wherein
the at least one slit includes one slit passing through a center of the protruded portion and extending entirely across the protruded portion such that both ends of the one slit reach the first welding portion.

6. The capacitor according to claim 2, wherein:
a pair of recessed portions are formed at the one end of the axial core to penetrate the axial core in the radial direction of the axial core, open toward the protruded portion, and oppose each other in the radial direction; and
the pair of recessed portions coincide with the slit when the one end of the axial core is fitted with the protruded portion.

7. The capacitor according to claim 2, wherein:
the first welding portion of the first current collecting member includes a plurality of first elongated projecting portions for welding, the plurality of first elongated projecting portions projecting toward the wound electrode group, opening toward a bottom portion of the container, and being formed at intervals in a circumferential direction about the protruded portion; and
the plurality of first elongated projecting portions are formed to extend between the protruded portion and an outer periphery of the first welding portion.

8. The capacitor according to claim 7, wherein
the plurality of first elongated projecting portions are welded to the first welded portion by laser welding.

9. The capacitor according to claim 8, wherein
the plurality of first elongated projecting portions are wider as measured in the vicinity of the outer periphery of the first welding portion than in the vicinity of the protruded portion.

10. The capacitor according to claim 2, wherein:
the second welding portion of the second current collecting member includes a recessed portion extending from an outermost periphery of the second welding portion toward the through hole and penetrating the second welding portion in a thickness direction; and
the one end of the tab is integrally provided with a bottom portion of the recessed portion.

11. The capacitor according to claim 10, wherein:
the second welding portion of the second current collecting member includes a plurality of second elongated projecting portions for welding, the plurality of second elongated projecting portions projecting toward the wound electrode group, opening toward the lid member, and being formed at intervals in a circumferential direction about the through hole; and
the plurality of second elongated projecting portions are formed to extend between the through hole and an outer periphery of the second welding portion.

12. The capacitor according to claim 11, wherein
the plurality of second elongated projecting portions are terminated before the outermost periphery.

13. The capacitor according to claim 12, wherein
the through hole is defined by being surrounded by a pair of parallel edge portions and a pair of arcuate edge portions connecting both ends of the pair of parallel edge portions.

14. The capacitor according to claim 11, wherein
the plurality of second elongated projecting portions are welded to the second welded portion by laser welding.

15. The capacitor according to claim 14, wherein
the plurality of second elongated projecting portions are wider as measured in the vicinity of the outer periphery of the second welding portion than in the vicinity of the through hole.

16. A capacitor comprising:
an electrode group unit including:
- a wound electrode group formed by winding a stacked member around a cylindrical axial core, the stacked member being formed by stacking an electrode having one of positive and negative polarities and formed of an elongated current collector having an active material layer formed thereon such that a first welded portion is left on one width-direction end of the electrode having the one of the polarities, a separator, and an electrode having the other of the polarities and formed of an elongated current collector having an active material layer formed thereon such that a second welded portion is left on the other width-direction end of the electrode having the other of the polarities,
- a first current collecting member supported by one end of the axial core and welded to the first welded portion of the electrode having the one of the polarities and included in the wound electrode group, and
- a second current collecting member supported by the other end of the axial core and welded to the second welded portion of the electrode having the other of the polarities and included in the wound electrode group;

an electrically conductive bottomed cylindrical container having an opening portion at one end thereof and configured to contain the electrode group unit therein; and
an electrically conductive lid member electrically insulated from the container and configured to block the opening portion of the container, wherein:
the first current collecting member is electrically connected to the container;
the second current collecting member is electrically connected to the lid member; and
the first current collecting member includes:
- a protruded portion protruded in a direction away from the axial core and fitted with the one end of the axial core,
- a first welding portion located on an outer side of the protruded portion and extending outward in a radial direction of the axial core to be welded to the first welded portion of the electrode having the one of the polarities, and
- at least one slit extending across the protruded portion and the first welding portion and penetrating the protruded portion and the first welding portion in a thickness direction.

17. The capacitor according to claim 16, wherein:
the at least one slit includes one slit passing through a center of the protruded portion and extending entirely across the protruded portion such that both ends of the one slit reach the first welding portion;
the first welding portion of the first current collecting member includes a plurality of first elongated projecting portions for welding, the plurality of first elongated projecting portions projecting toward the wound electrode group, opening toward a bottom portion of the container, and being formed at equal intervals in a circumferential direction about the protruded portion;
the plurality of first elongated projecting portions are formed to extend between the protruded portion and an outer periphery of the first welding portion; and
two of the plurality of first elongated projecting portions are disposed on an extension line of the slit, and the two first elongated projecting portions are shorter than the rest of the plurality of first elongated projecting portions.

18. The capacitor according to claim 17, wherein
the plurality of first elongated projecting portions are welded to the first welded portion by laser welding.

19. The capacitor according to claim 18, wherein
the plurality of first elongated projecting portions are wider as measured in the vicinity of the outer periphery of the first welding portion than in the vicinity of the protruded portion.

20. The capacitor according to claim 16, wherein
the at least one slit extends entirely across the protruded portion such that both ends of the at least one slit reach the first welding portion.

21. The capacitor according to claim 16, wherein
the at least one slit includes one slit passing through a center of the protruded portion and extending entirely across the protruded portion such that both ends of the one slit reach the first welding portion.

22. The capacitor according to claim 16, wherein:
a pair of recessed portions are formed at the one end of the axial core to penetrate the axial core in the radial direction of the axial core, open toward the protruded portion, and oppose each other in the radial direction; and
the pair of recessed portions coincide with the slit when the one end of the axial core is fitted with the protruded portion.

23. The capacitor according to claim 16, wherein:
the first welding portion of the first current collecting member includes a plurality of first elongated projecting portions for welding, the plurality of first elongated projecting portions projecting toward the wound electrode group, opening toward a bottom portion of the container, and being formed at intervals in a circumferential direction about the protruded portion; and
the plurality of first elongated projecting portions are formed to extend between the protruded portion and an outer periphery of the first welding portion.

24. The capacitor according to claim 23, wherein
the plurality of second elongated projecting portions are welded to the second welded portion by laser welding.

25. The capacitor according to claim 24, wherein
the plurality of second elongated projecting portions are wider as measured in the vicinity of the outer periphery of the second welding portion than in the vicinity of the through hole.

26. A capacitor comprising:
an electrode group unit including:
- a wound electrode group formed by winding a stacked member around a cylindrical axial core, the stacked member being formed by stacking an electrode having one of positive and negative polarities and formed of an elongated current collector having an active material layer formed thereon such that a first welded portion is left on one width-direction end of the electrode having the one of the polarities, a separator, and an electrode having the other of the polarities and formed of an elongated current collector having an active material layer formed thereon such that a second welded portion is left on the other width-direction end of the electrode having the other of the polarities, a first current collecting member supported by one end of the axial core and welded to the first welded portion of the electrode having the one of the polarities and included in the wound electrode group, and a second current collecting member supported by the other end of the axial core and welded to the second welded portion of the electrode having the other of the polarities and included in the wound electrode group;

an electrically conductive bottomed cylindrical container having an opening portion at one end thereof and configured to contain the electrode group unit therein; and an electrically conductive lid member electrically insulated from the container and configured to block the opening portion of the container, wherein:

the first current collecting member is electrically connected to the container;

the second current collecting member is electrically connected to the lid member;

the second current collecting member includes:

a through hole to be fitted with the other end of the axial core, a second welding portion located on an outer side of the through hole and extending outward in the radial direction of the axial core to be welded to the second welded portion of the electrode having the other of the polarities, and a tab having two ends, one of the two ends being integrally provided with the second welding portion and the other of the two ends being electrically connected to the lid member; and at least one elongated projection is formed in the vicinity of the one end of the tab to extend in a width direction of the tab, projects toward the wound electrode group, and opens toward the lid member.

27. The capacitor according to claim 26, wherein:

the second welding portion of the second current collecting member includes a recessed portion extending from an outermost periphery of the second welding portion toward the through hole and penetrating the second welding portion in a thickness direction; and the one end of the tab is integrally provided with a bottom portion of the recessed portion.

28. The capacitor according to claim 27, wherein:

the second welding portion of the second current collecting member includes a plurality of second elongated projecting portions for welding, the plurality of second elongated projecting portions projecting toward the wound electrode group, opening toward the lid member, and being formed at intervals in a circumferential direction about the through hole; and the plurality of second elongated projecting portions are formed to extend between the through hole and an outer periphery of the second welding portion.

29. The capacitor according to claim 28, wherein the plurality of second elongated projecting portions are terminated before the outermost periphery.

30. The capacitor according to claim 29, wherein the through hole is defined by being surrounded by a pair of parallel edge portions and a pair of arcuate edge portions connecting both ends of the pair of parallel edge portions.

\* \* \* \* \*